(12) United States Patent
Linenbach et al.

(10) Patent No.: US 6,480,847 B1
(45) Date of Patent: Nov. 12, 2002

(54) DATABASE REPOSITORY WITH DEFERRED TRANSACTIONS

(75) Inventors: Terris J. Linenbach, San Mateo; Vladimir Gorelik, Fremont; Craig R. Powers, Belmont; Robert E. Powers, Fremont; Tana C. Netsch, Santa Clara, all of CA (US)

(73) Assignee: Sagent Technology, Inc., Mountain View, CA (US)

( * ) Notice: Subject to any disclaimer, the term of this patent is extended or adjusted under 35 U.S.C. 154(b) by 0 days.

(21) Appl. No.: 09/240,733

(22) Filed: Jan. 29, 1999

Related U.S. Application Data

(63) Continuation of application No. 08/757,719, filed on Nov. 26, 1996, now Pat. No. 5,930,794.
(60) Provisional application No. 60/028,970, filed on Oct. 18, 1996.

(51) Int. Cl.[7] .............................. G06F 17/30; G06F 7/00
(52) U.S. Cl. .......................... 707/8; 707/200; 707/203; 707/100; 707/104.1; 707/201; 711/148; 711/149; 711/150; 711/151; 711/152; 711/168
(58) Field of Search ..................... 707/1–10, 100–104.1, 707/200–205; 711/168, 1–6, 100–106, 147–165; 700/1–4, 19–20, 53; 703/1; 709/100–108, 1

(56) References Cited

U.S. PATENT DOCUMENTS

| | | | | |
|---|---|---|---|---|
| 4,965,719 A | * | 10/1990 | Shoens et al. ............... 711/100 |
| 5,212,788 A | * | 5/1993 | Lomet et al. ................ 707/201 |
| 5,485,369 A | | 1/1996 | Nicholls et al. ............... 705/9 |
| 5,499,365 A | * | 3/1996 | Anderson et al. ............ 395/600 |
| 5,564,044 A | | 10/1996 | Pratt ............................ 709/106 |
| 5,566,330 A | | 10/1996 | Sheffield ......................... 707/4 |
| 5,586,315 A | * | 12/1996 | Narang et al. ............... 395/619 |
| 5,649,200 A | * | 7/1997 | Leblang et al. .............. 395/703 |
| 5,666,546 A | | 9/1997 | Donnan ........................ 395/472 |
| 5,675,785 A | * | 10/1997 | Hall et al. .................... 395/613 |
| 5,678,040 A | | 10/1997 | Vasudevan et al. .......... 395/608 |
| 5,682,537 A | * | 10/1997 | Davies et al. ................... 707/8 |
| 5,689,706 A | * | 11/1997 | Rao et al. ..................... 395/617 |

(List continued on next page.)

OTHER PUBLICATIONS

Linenbach, T., "Reusable binary association in C++; a cookie–cutter approach for representing abstract relationships", *Dr. Dobb's Journal*, vol. 21, No. 6, p. 34(8), Jun. 1996.

(List continued on next page.)

*Primary Examiner*—Greta Robinson
*Assistant Examiner*—Linh Black
(74) *Attorney, Agent, or Firm*—Blakely, Sokoloff, Taylor & Zafman LLP

(57) ABSTRACT

A deferred transaction mechanism facilitates multi-threaded operation of database application programs. The deferred transaction mechanism allows data items to be committed from the local memory of a computer system to a database system in a background thread, while other foreground threads continue to read the data item. In most instances, this makes the delay in committing a data item to the database imperceptible to a human user of a database application program. The deferred transaction mechanism further supports an "undo" feature, which allows modifications to a data item located in a computer's local memory to be rapidly discarded.

15 Claims, 6 Drawing Sheets

U.S. PATENT DOCUMENTS

| | | | | |
|---|---|---|---|---|
| 5,692,178 | A | * 11/1997 | Shaughnessy | 707/8 |
| 5,701,480 | A | * 12/1997 | Raz | 709/101 |
| 5,715,428 | A | 2/1998 | Wang et al. | 395/468 |
| 5,742,813 | A | * 4/1998 | Kavanagh et al. | 706/50 |
| 5,752,018 | A | 5/1998 | Sheffield | 707/2 |
| 5,781,915 | A | 7/1998 | Kohno et al. | 707/511 |
| 5,809,503 | A | * 9/1998 | Aoshima | 707/8 |
| 5,813,016 | A | 9/1998 | Sumimoto | 707/201 |
| 5,826,253 | A | * 10/1998 | Bredenberg | 707/1 |
| 5,832,481 | A | 11/1998 | Sheffield | 707/4 |
| 6,128,771 | A | * 10/2000 | Tock et al. | 707/1 |
| 6,256,712 | B1 | * 7/2001 | Challenger et al. | 707/103 Y |
| 6,321,234 | B1 | * 11/2001 | Le Van Suu | 706/1 |

OTHER PUBLICATIONS

Shu, N.C. et al., "Express: A Data Extraction, Processing, and Restructuring System", *ACM Transactions on Database Systems*, vol. 2, No. 2, Jun. 1977, pp. 134–174.

Shu, N.C. et al., "Convert: A High Level Translation Definition Language for Data Conversion", *Communications of the ACM*, vol. 18, No. 10, Oct. 1975, pp. 557–567.

Lum, V. Y. et al., "A General Methodology for Data Conversion and Restructuring", *IBM J. Res. Develop.*, Sep. 1976, pp. 483–497.

Birss, Edward W. et al., "Generalized software for translating data", *AFIPS Conference Proceedings*, 1976 National Computer Conference, Jun. 7–10, 1976, New York, NY, pp. 889–897.

Rin, N. Adam et al., "An Overview of a System for Automatic Generation of File Conversion Programs", *Software—Practice and Experience*, vol. 5, John Wiley & Sons, Ltd. (1975), pp. 193–202.

Zloof, M. et al., "The System for Business Automation (SBA): Programming Language", *Communications of the ACM*, vol. 20, No. 6, Jun. 1977, pp. 385–396.

* cited by examiner

DATABASE REPOSITORY WITH DEFERRED TRANSACTIONS

RELATED APPLICATIONS

This application is a Continuation of U.S. patent application Ser. No. 08/757,719, filed Nov. 26, 1996, now Issued as U.S. Pat. No. 5,930,794 on Jul. 27, 1999, entitled "Database Repository With Deferred Transactions," by inventors Terris J. Linenbach, Vladimir Gorelik, Craig R. Powers, Robert E. Powers and Tana C. Netsch which claims the benefit of provisional application 60,028,970 filed on Oct. 18, 1996.

BACKGROUND

1. Field of Invention

The field of the invention relates to computer database management systems, computer database application programs, and computer operating systems. In particular, the field of the invention relates to a method and apparatus for performing deferred transactions and undoing prior modifications of data in a database application environment.

2. Related Art

Database management systems are in wide spread use in both stand alone computer systems, such as main frames, as well as in client-server distributed computer systems. Database application programs operate by retrieving data items from these database management systems, performing modifications on these data items, and finally returning the data items to the database management systems. Database management systems are usually accessed through interface functions which control the manner in which data can be accessed, and thereby maintain integrity of the data inside the database management system.

A particular challenge is posed by database application programs which support multi-threaded operation, which can unpredictably affect a data item after is has been retrieved from a database management system. In multi-threaded operation, performance is improved by splitting up the functions of a database application into a set of independently executable tasks. These tasks are then separately executed by a collection of "threads." This allows the tasks of a database application to be accomplished concurrently, which can greatly increase database application performance. If one thread blocks while performing a particular operation, for example retrieving something from the database management system, another thread can continue to execute another task.

Multi-threading complicates the process of maintaining the integrity of a data item after it has been retrieved from the database management system. In particular, multi-threading complicates the process of moving a data item from a computer's local memory to the database management system. While one thread is writing the data item to the database, another thread can potentially modify the data item. This can create inconsistencies in the data item if a modification is only partly recorded as the data item is stored to the database management system. Conventional database applications prevent this problem by locking the data item while it is being written to the database management system, so that other threads cannot access it. This locking operation will ensure the data item is stored to the database management system in a consistent state. However, the data item is not accessible by other threads during this commit operation, and system performance can suffer if other threads attempt to access the data items while the commit operation is taking place. This performance delay is particularly noticeable to a human user of the database application program who requests that a data item be stored to the database management system. The human user will typically have to wait until the data item is committed to the database management system before proceeding to operate on the data item.

The performance drawbacks from locking can be overcome in a number of ways. Database application programs can simply eliminate multi-threaded operation, which will eliminate the need to perform any locking. However, doing so will seriously degrade database application performance. Alternatively, the database application user can simply perform fewer commit operations, which will eliminate the delay associated with the commit operations. However, performing fewer commit operations will increase the risk that modifications to data items will be lost during a system failure.

SUMMARY

This invention relates to a method and apparatus for performing deferred transactions and undoing modifications to data in a database application program. This method and apparatus allow modifications to a data item to be committed to a database in a background thread while a database application user continues to work on the data item, as if the commit operation had already completed. This is accomplished by placing a read lock on the data item, which allows the data item to be read, but not written to, while the data item is committed to the database by a background thread.

This deferred commit operation has a number of benefits. To a human operator, the deferred commit operation appears to be instantaneous. The human operator can proceed to access the object, and is merely precluded from making subsequent modifications to the object until the commit operation has finished. However, the human user typically takes a significant amount of time to think about and then input subsequent modifications. Consequently, the human user is rarely barred from making further modifications to the object, because it is quite likely that the commit operation will have completed and the read lock will be released before the human user acts to modify the data item.

When a human user initiates a commit operation, if the human user is subsequently barred from performing additional operations until the commit operation is complete. the human user perceives the delay in performing the commit operation to be quite large, even if it is only a few seconds. However, if the human user is allowed to continue working on the data, the human user will require a significant amount of time to think about a new modification and to input this modification. During this lag in human response time, the commit operation is likely to terminate.

The perceived rapid speed of these deferred commit operations makes it more likely that human users will commit data. Data will therefore be committed to permanent storage more frequently, and system failures will consequently have fewer negative consequences.

A preferred embodiment of the deferred commit operation works in a computer system with a local memory which supports concurrent program execution by multiple processes. The computer system is coupled to a database.

The preferred embodiment of the deferred commit operation works as follows. First, a data item is placed in local memory. Either the data item is retrieved from the database and placed in the local memory, or it is produced by the computer system and placed in the local memory. Second, the data item in local memory is modified. Third, a read lock is placed on the data item which allows the computer system's multiple processes to read the data item, but prevents the multiple processes from writing to write the data item. Fourth, while this read lock is in place, the data item is copied to the database by a background thread, while foreground threads continue to read the data item. Finally, after the copy operation is complete, the read lock is released.

In another preferred embodiment of the deferred commit operation, while the data item is being modified in local memory, a write lock is placed on the data item. This write lock allows only "user processes," which take commands from a user interface, to access the data item and prevents all other processes from accessing the data item. When the modifications are complete., the write lock is converted to a read lock, which allows the computer system's multiple processes to read the data item, but prevents the multiple processes from writing to the data item.

A preferred embodiment of the undo feature works as follows. First, a data item is placed in local memory. Second, a copy is made of the data item, and this copy is placed in local memory. Third, modifications are made to the copy. Fourth, if a command is received to undo the modifications, a new copy is created from the original data item. Finally, if a command is received the commit these modifications, a new original data item is created from the modified copy.

Another preferred embodiment of the invention integrates of the above-described deferred commit operation and undo feature into hybrid a system which provides both capabilities.

DESCRIPTION

The following description is presented to enable any person skilled in the art to make and use the invention, and is provided in the context of a particular application and its requirements. Various modifications to the preferred embodiment will be readily apparent to those skilled in the art, and the general principles defined herein may be applied to other embodiments and applications without departing from the spirit and scope of the invention. Thus, the present invention is not intended to be limited to the embodiment shown, but is to be accorded the widest scope consistent with the principles and features disclosed herein.

Figure 1:
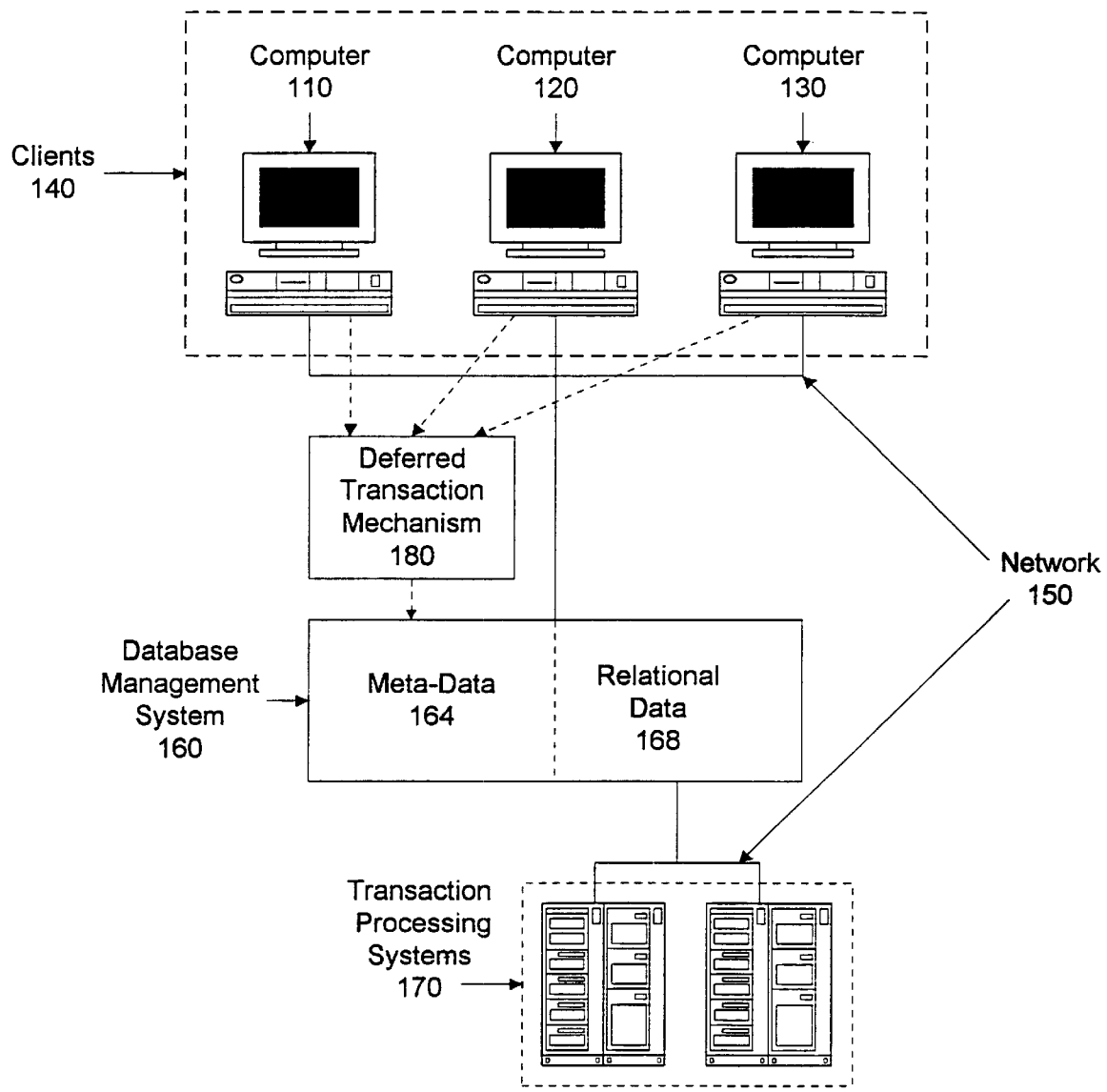
FIG. 1 is a diagram illustrating where the deferred transaction mechanism fits into a computer system, and how it connects to the underlying database management system, in accordance with an aspect of the present invention.

FIG. 1 illustrates the distributed database system in which the deferred transaction mechanism operates. Computers 110, 120, and 130 comprise a collection of clients 140. These clients are connected via network 150 to database management system 160.

Computers 110, 120 and 130 can be any type of computational system capable of connecting to network 150. Such computational systems typically include a processor, a memory and a disk drive. For example, computers 110, 120 and 130 may be personal computers, computer workstations, or multi-user computer systems. Computers 110, 120 and 130 are clients 140 of a server which supports a database management system 160.

Network 150 may be any type of network linking computer systems together. Of course, overall system performance will depend upon the performance characteristics of a particular network. In the embodiment as illustrated in FIG. 1, network 150 also connects database management system 160 to transaction processing system 170. A variety of network connections are possible. For example, the clients 140 may be connected to the database management system 160 through a first network, and the database management system 160 can be connected to the online transaction processing system 170 through a second network.

Database management system 160 is an online analytic processing system which is optimized to access and analyze existing data, for example through relational queries. This differs from the online transaction processing system 170, which is optimized to insert data. Other configurations are possible. For example, the database server may be one of a number of online analytic processing systems which are connected to a number of online transaction processing systems. In another embodiment, the database management system is one of a number of analytic processing systems which are connected to a large central data warehouse, where this data warehouse is connected to a number of online transaction processing systems.

Database server 160 contains two types of data: metadata 164 and relational data 168. Relational data 168 is data that is typically stored in relational database systems in the form of tables. Metadata 164 defines relationships between relational data 168. For example, an SQL query which selects a column of a table would be metadata 164, and an operation such as filtering on "age greater than forty" would be metadata 164. Whereas, the actual contents of a column of a table would be relational data.

In one preferred embodiment, the deferred transaction mechanism 180 operates only on metadata 164. A deferred transaction mechanism according to other embodiments of the present invention is applied to other types of data stored in any type of database, including metadata 164 or relational data 168.

The deferred transaction mechanism 180 operates on data stored on clients 140 to ensure that data is properly transferred between clients 140 and database management system 160. During normal operation, data from transaction and processing system 170 is moved to database management system 160. Clients 140 can then access and manipulate data from database management system 160. This typically involves moving data from database management system 160 to the clients 140, where the data can be stored and manipulated locally. The deferred transaction mechanism 180 ensures that data which has been manipulated and stored locally by clients 140 is properly transferred and stored to database management system 160.

Figure 2:
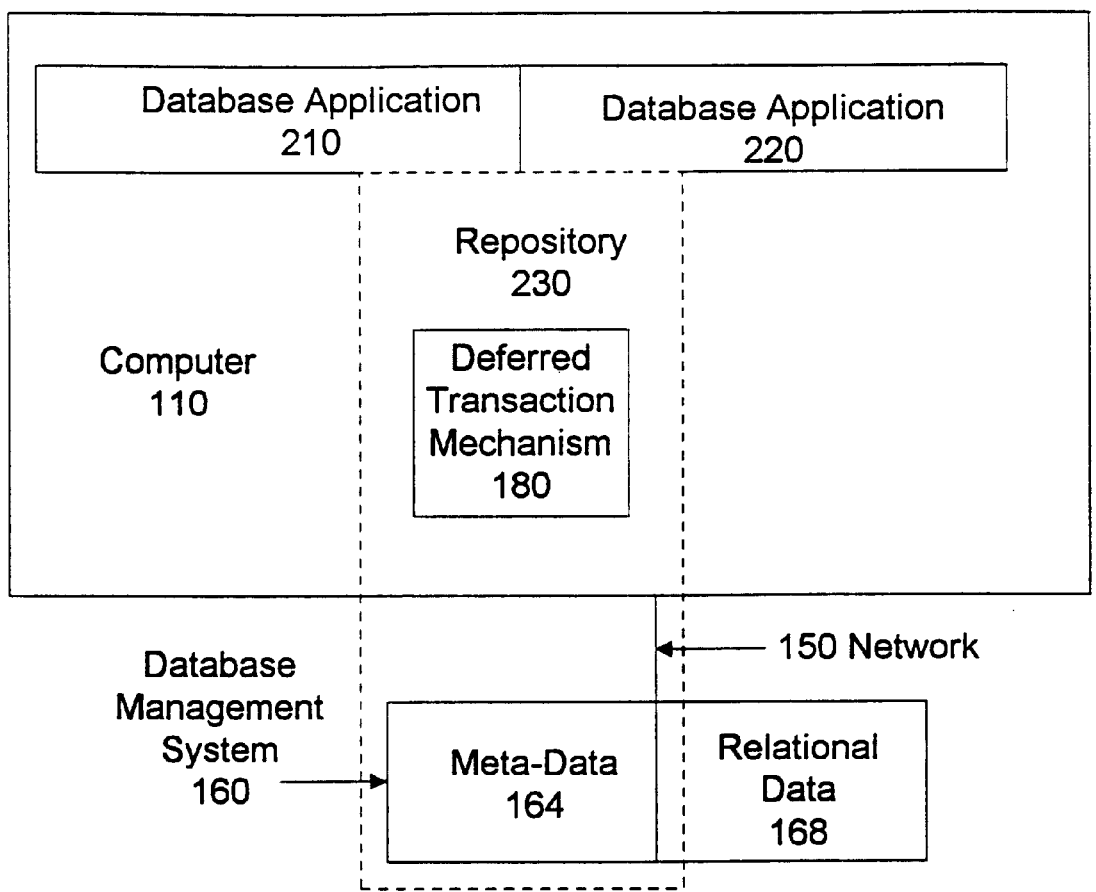
FIG. 2 is a block diagram showing how the deferred transaction mechanism 180 from FIG. 1 is located within a repository, and how this repository interfaces with database applications, in accordance with an aspect of the present invention.

FIG. 2 illustrates where the deferred transaction mechanism 180 is located and how it relates to data base applications. As can be seen from FIG. 2, the deferred transaction mechanism 180 is located within an entity called a repository 230, which includes structures within computer 110 as well as the metadata 164 stored on database management system 160. In one embodiment, the repository 230 is purely a software structure. It is also possible to implement repository features in hardware as well as software. The repository 230 is connected to database management system 160 through network 150. As mentioned above, database management system 160 contains both metadata 164 and relational data 168. Database application 210 and database application 220 use repository 230 to keep track of metadata items 164.

For performance reasons portions of repository 230, as well as database applications 210 and 220., are located locally on computer system 110, because communications across network 150 may be quite time consuming. Components of the database applications 210 and 220 as well as the repository 230 may be located at the database server as well, or alternatively at other locations in the network 150.

Data base application 210 and database application 220 are multi-threaded. Multi-threading improves database application performance by allowing tasks to be divided up into sub-tasks and processed by multiple threads. If one thread blocks while performing a particular task, other threads can go on to do useful work in the interim. However, multi-threading creates problems in coordinating modifications of data items. Without proper coordination, it is possible for multiple threads to modify the same item of data in unpredictable ways. One advantage of the deferred transaction mechanism 180 is that it allows database applications to continue operating while update operations are taking place in the background.

During normal operation, database application 210 will request an item of metadata 164 from repository 230. If the item of metadata 164 is not present locally in computer 110, the repository 230 will make a request over network 150 to database server 160 to retrieve the item of metadata 164. A copy of this item of metadata 164 will then be stored locally on computer 110. Database application 210 and database application 220 may then view and modify this copy of the metadata item 164. Database applications 210 and 220 may periodically request that a particular item of metadata 164 be committed (written) to database management system 160. Deferred transaction mechanism 180 will then ensure that the metadata item 164 is properly committed to the database management system 160, while at the same time allowing database applications 210 and 220 to continue viewing the metadata item 164.

Figure 3:
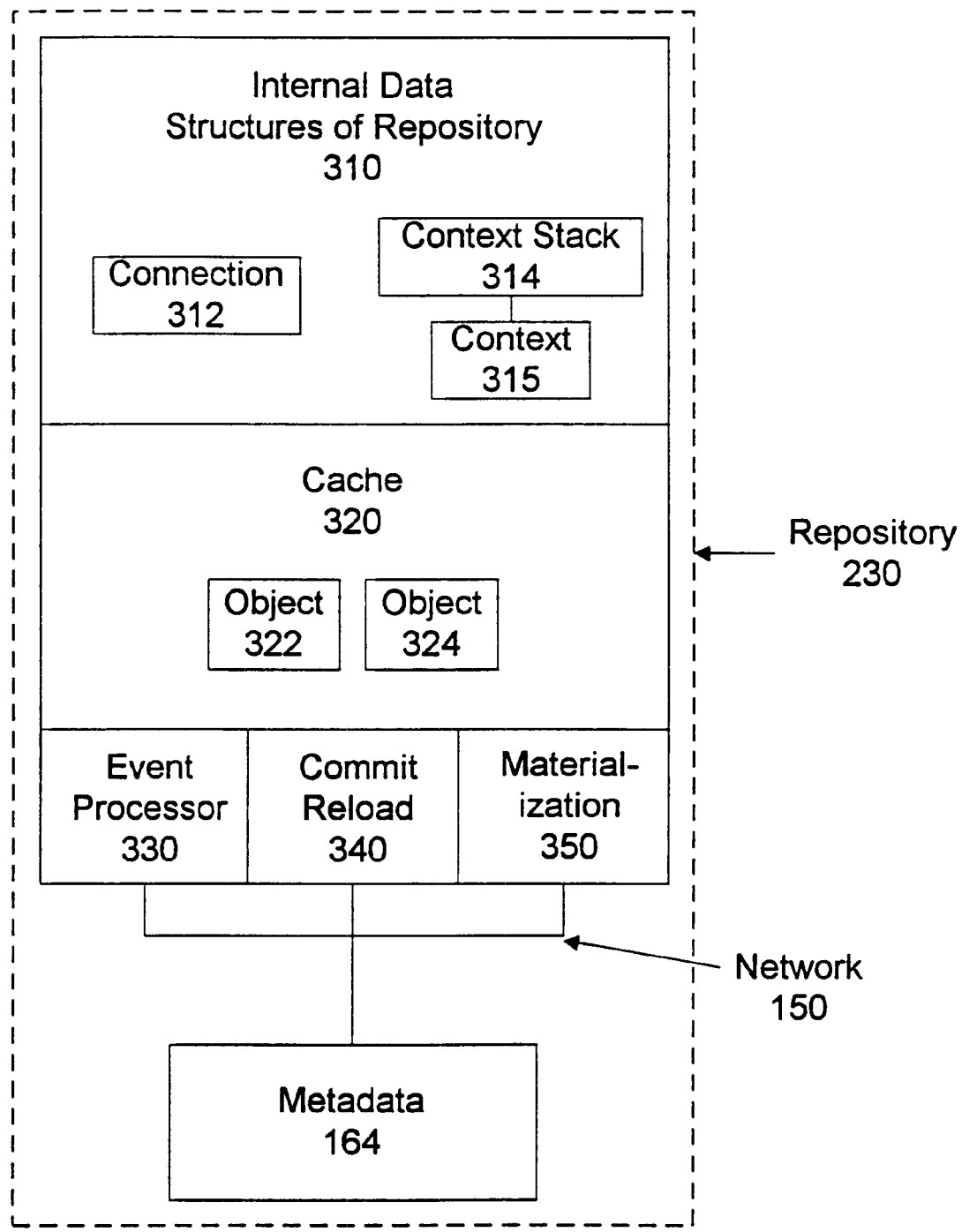
FIG. 3 is a block diagram illustrating the internal structure of the repository 230 of FIG. 2, in accordance with an aspect of the present invention.

FIG. 3 illustrates the internal structure of repository 230. A number of components of repository 230 participate in the deferred transaction mechanism 180: internal data structures 310 of the repository 230, cache 320, event processor 330, commit reload part 340, materialization part 350, and metadata 164 located on database management system 160.

The following internal data structures 310 are involved in the deferred transaction mechanism. A connection 312 is an entity through which database applications access the repository, and can be thought of as an entry point for one or more threads into repository 230. The connection 312 is responsible for performing authentication operations when a database application logs into the repository.

A context 315 is data structure associated with a unit of work, which may be performed by a group of threads. Typically, only one thread may hold the context at any one time. A context 315 keeps track of which objects a group of threads has accessed, and which objects a group of threads has modified. A context 315 also contains pointers to data items (addresses of data items). Threads access data items exclusively through these pointers. This ensures that only the threads associated with a context 315 will access the data items associated with a context.

A database application can activate a context 315, deactivate a context 315, or create a new context 315 . However, the details of context management, including the context stack 314, are hidden from the database application. The context stack 314 can be thought of as a stack of contexts. As a thread picks up a new context 315, that context 315 is placed at the top of the context stack 314 and becomes the active context. FIG. 3 illustrates a single context 315 connected to context stack 314, although it is possible for a larger number of contexts to be associated with a single context stack 314.

The cache 320 is a storage area for metadata items 164 which are stored as objects 322 and 324. In one embodiment, only a single copy of each object is stored in cache 320. In an alternative embodiment, two copies of each object are kept in cache 320 to facilitate a system for undoing modifications. The advantage to storing data items in cache 320 is that cache 320 is resident in local memory of a computer 310. This facilitates rapid access to data items without having to perform frequent communications over network 150 to database management system 160. However, modifications must be periodically recorded to more permanent storage on database management system 160. To accomplish this, data items are transferred over network 150 to database management system 160.

The event processor 330 ensures that processes get notified of specified events. For example, the event processor ensures that other caches, which may be storing copies of a data item which has been modified in another cache, are properly informed of the modification. The event processor also monitors commit operations, which write data to database management system 160, to determine when such commit operations complete. The commit reload part 340 is the portion of repository 230 which is most responsible for performing deferred transactions, it moves data between cache 320 and the underlying database management system 160. The materialization part 350 is responsible for bringing objects into cache from the database management system 160, and for converting database objects into a form that database applications can manipulate. In one embodiment, the materialization part takes data items from database management system 160 in relational form and converts them into C++ objects.

Figure 4:
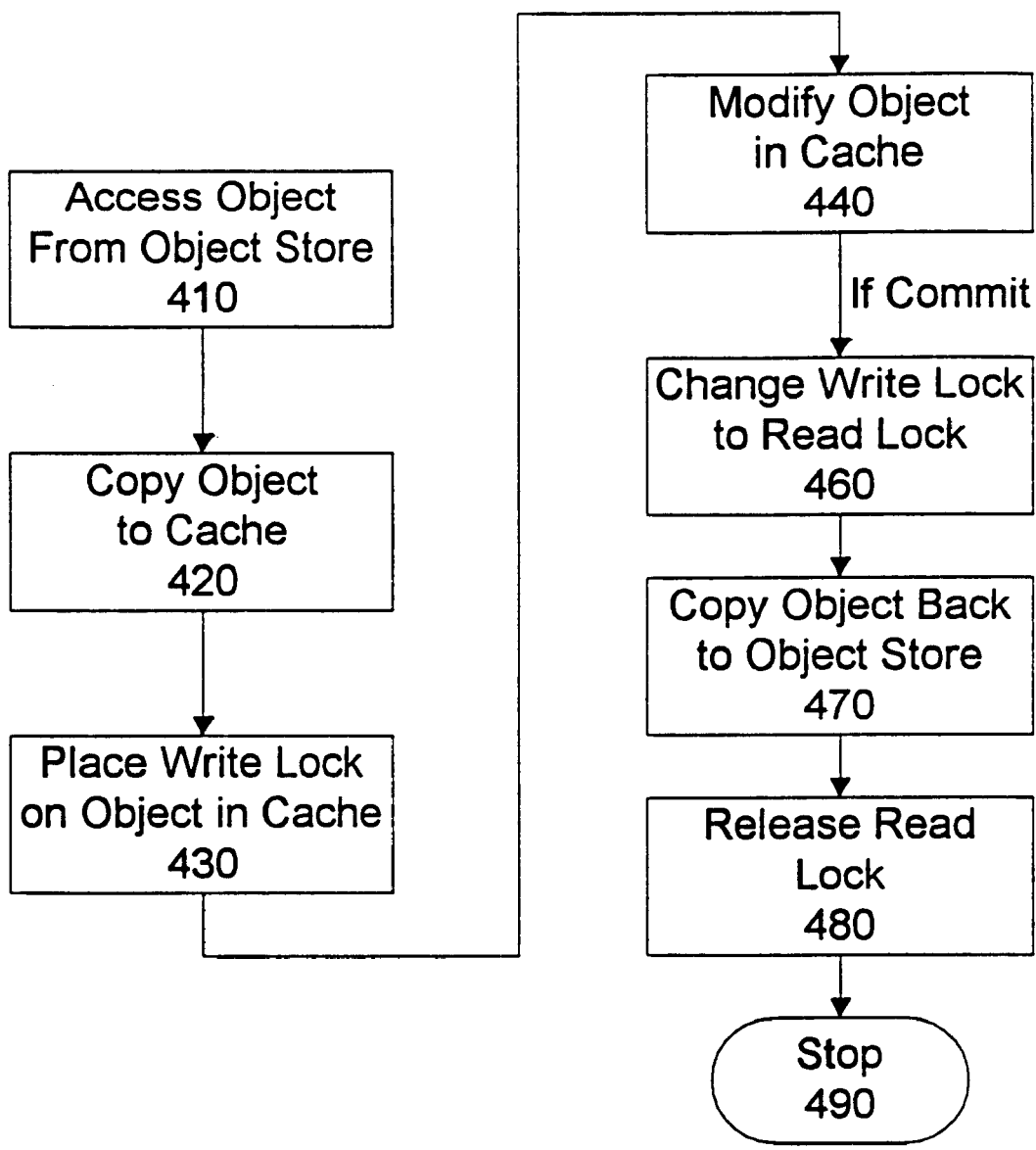
FIG. 4 is a flow chart illustrating the deferred commit operation, in accordance with an aspect of the present invention.

FIG. 4 is a flow chart of a deferred commit operation, which copies data from the repository 230 to database management system 160. At step 410, an object is accessed from the object store. In one embodiment, the object store is a database management system 160 such as in FIG. 3. However, any type of data storage facility can function as an object store. At step 420, the object is copied into cache 320. In one embodiment, this cache 320 is located within repository 230 which is itself located within computer 110. However, any secondary data storage area separate from the object store can function as a cache. At step 430, a write lock is placed on the object in cache. This write lock ensures that other threads—or even the current thread operating through a different context—cannot modify the object while it is being modified by the current thread in the current context. In one embodiment, the write lock is created automatically whenever a write operation is performed to an object in cache. In the absence of a system which automatically creates write locks, a write lock must be explicitly placed on an object before it may be modified. At step 440, the database application or database user modifies the object in cache. Any number of modifications can take place, however, these modifications will only affect the local copy of the object in cache, and not the copy of the object in the object store.

Next, if the database application or user generates a "commit" signal, the deferred commit operation takes place, which writes data from cache 320 to database management system 160. In the first step in a deferred commit operation 460, the write lock on the data item is changed to a read lock. A read lock is not exclusive. It allows other threads or other contexts to read the data item, but prevents the other contexts or other threads from writing to the object. In step 470, while the read lock is in place, the object is copied from the cache 320 to the object store. Finally, in step 480, after the object is recorded in the object store, the read lock is released. Note that the task of copying the object back to the object store 470 is accomplished using a background thread. This allows work to proceed on the object in the current thread and the current context, or in other threads or other contexts, while the object is committed to the object store in the background. Of course, the read lock prevents any subsequent modification of the data item until the copy is completed and the read lock is ultimately released. Finally, in step 490, the commit process terminates. In another embodiment, the system returns to step 440, to allow further modifications to the object in cache, and subsequent commit commands will cause the sequence of steps 460, 470 and 480 to be repeated. In another embodiment, deferred commit operation embodied in FIG. 4 is performed on a group of related objects, instead of only a single object.

Figure 5:
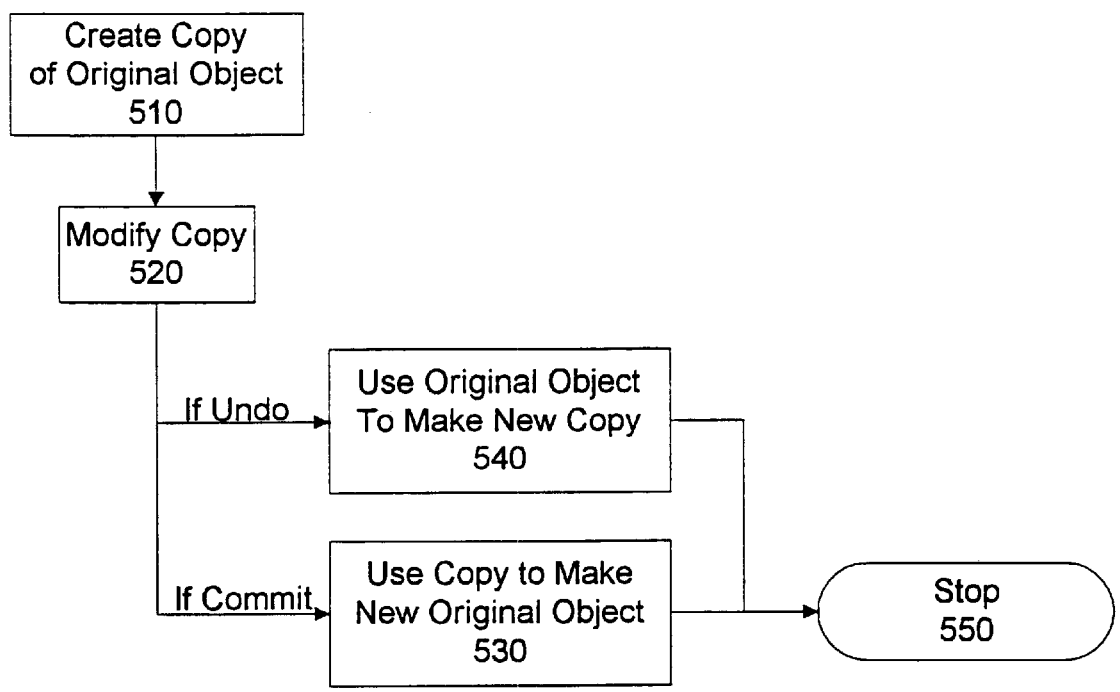
FIG. 5 is a flow chart of the "undo" feature of the deferred transaction mechanism, in accordance with an aspect of the present invention.

FIG. 5 illustrates the "undo" feature of the deferred transaction mechanism. This feature allows modifications to metadata 164 to be undone—which means to be effectively discarded or ignored. The feature requires two copies of a metadata item 164 to be stored in cache 320, the original object and a copy. The original object can be created by the system user, or can originate in the database management system 160 from where it is transferred into cache 320. The first step 510, in system operation is to create a copy of the original object. In one embodiment, this copy is made exclusive to the thread, by placing a write lock on the object, which prevents other threads from modifying the object. At step 520, the thread performs modifications on its copy of the original object. Any number of modifications can take place until either a "undo" command or a "commit" command is received.

If an "undo" command is received, the system moves to step 540, where the copy is used to make a new original object. In this way, modifications to the data item are effectively discarded or undone because the copy of the data item upon which modifications were performed is thrown away. Next, at step 550, the system reaches a stop state. However, in another embodiment, after the undo operation is accomplished the system returns to step 520, where further modifications can be made on the copy. Although the undo feature is an integral part of the deferred transaction mechanism, it may be applied to any context in which modification operations are performed on data which is later stored on a more permanent storage medium.

If a "commit" command is received, the system moves to step 530, where the copy is used to make a new original object in cache 320. In this way, modifications to the copy are recorded in the original object. There are a number of additional ways to propagate the modifications from the copy to the original object. For example, a completely new original object may be created and linked into the system. Alternatively, the original object may be overwritten with the contents of the copy. It is also possible for the modifications made to the copy to simply be repeated on the original object. After the commit is finished, the system reaches step 550 where it stops. Alternatively, the system may return to step 520, where the copy is further modified.

In a preferred embodiment, there are two levels of commit operations. A "cache commit" operation merely propagates the modifications of the copy to the original object in cache 320. In a "dbms commit" operation, modifications to the copy are first propagated to the original object, and then to the database management system 160.

DEFERRED TRANSACTION EXAMPLE

Figure 6:
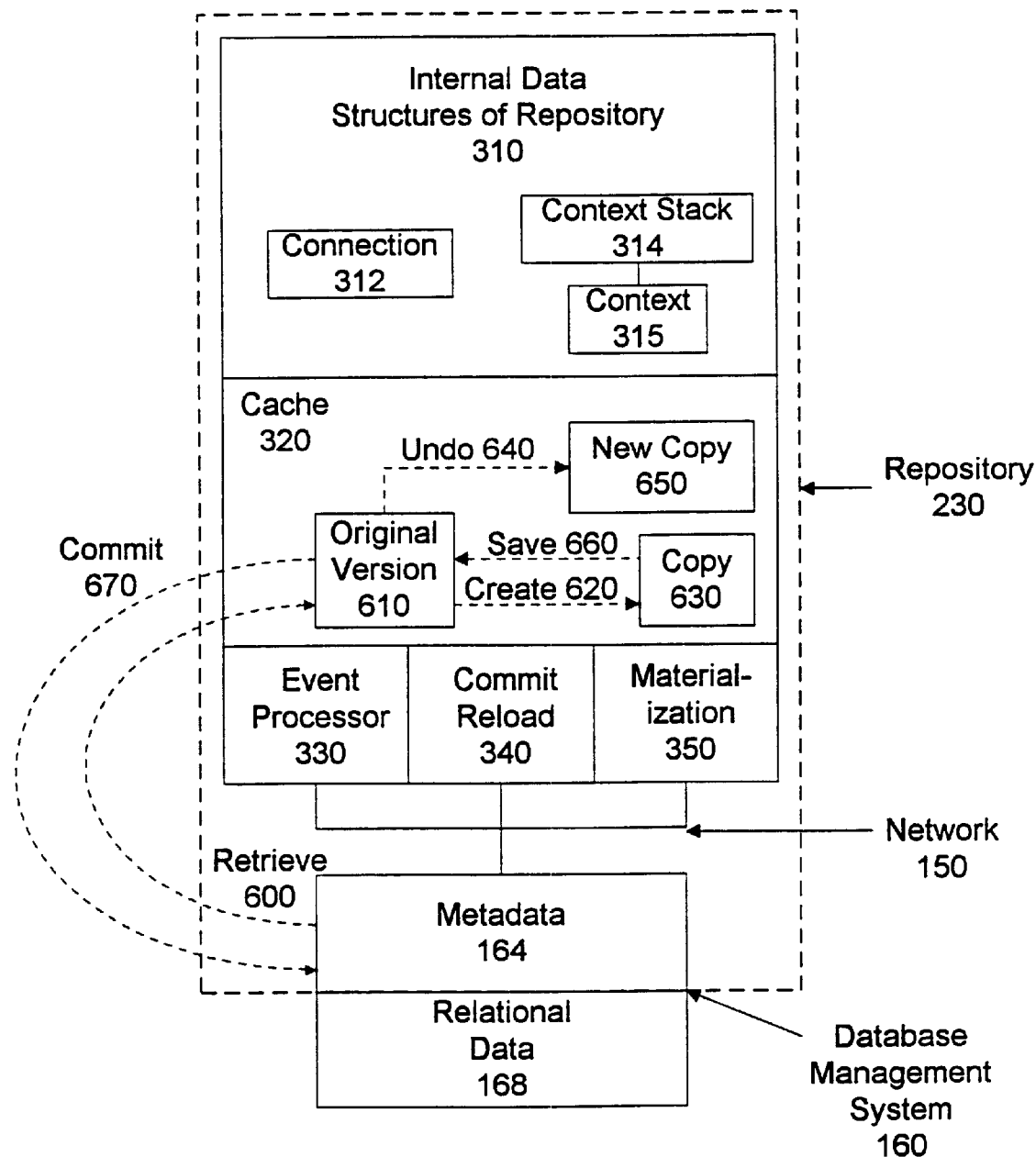
FIG. 6 is a block diagram illustrating a sequence of actions of the deferred transaction mechanism in accordance with an aspect of the present invention.

FIG. 6 illustrates the sequence of events in one embodiment of a deferred transaction operation. This embodiment allows a database user to manipulate data extracted from a relational database through a graphical user interface (GUI). The user can manipulate relational data items 168 by manipulating corresponding icons in the GUI. Icons correspond to both selections of data, such as specifying a column of a table, and operations on data items, such as filtering on "age greater than forty." The user interconnects these icons with links to specify how data is retrieved and transformed or filtered from an underlying relational database.

The deferred transaction operates on metadata 164, which is not the underlying relational data itself 168, but rather selections on relational data 168 on transformations of the relational data 168. For example, the specification to "select column A of table B" is an item of metadata 164, whereas the actual contents of column A of table B is not. Operations on data such as "filter on age greater than forty" are also metadata 164.

The system keeps track of selections and operations as lower level metadata items called "steps." Each step has a number of inputs and outputs which specify the linkages between steps. The systems also maintains higher level metadata items called "plans," which correspond to a collection of interlinked steps which appear on a single GUI screen.

Both steps and plans are stored as metadata "objects." These objects are 2K bytes in size, and many thousands of metadata items are commonly stored in the database management system 160 at one time. These metadata items 160 are kept separate from the underlying relational data, which is also stored on database management system 160.

The deferred transaction mechanism works in the following way. First, the user either requests an existing plan, or the user creates a plan. To request an existing plan, a database search engine searches through database management system 160, and finds all plans associated with a particular user. These plans are presented to the user in the GUI. The user then selects a particular plan to access from the GUI which causes the database application to access the object corresponding to the plan from the cache 320. If the plan does not exist in the cache 320, a request for the plan is made to database management system 160. When the plan is located in the database management system 160, the plan is retrieved 600, and an original version 610 of the plan is created in cache 320.

To create a plan, the user first establishes a connection to the repository 230, which involves setting up a number of data structures as well as authenticating the user to ensure the user has access to the repository 230. The user then goes through the connection 312 to an entity called the factory. The factory performs all of the initialization operations necessary to create a new plan, and places this new plan in cache 320.

The user must have an active context 315 open in order to perform work within the repository 230. In one embodiment, a context 315 may be activated and deactivated periodically, depending upon whether the group of threads associated with the context 315 is currently acting on the plan associated with the context 315.

The context 315 is created for a group of threads working on a particular plan. The context 315 maintains a list of all of the data items that the group of threads has accessed including pointers to these data items. Threads access data items exclusively through these pointers, which ensures that only threads associated with a context 315 will modify data items associated with the context 315. The context 315 also keeps track of which data items its associated group of threads has modified.

In this example, the context 315 keeps track of only higher level objects, namely plans. However, this need not be the case: contexts may be used to keep track of any data items which may be modified.

After a plan is created or retrieved from database management system 160, an original version 610 is created in cache 320. This original version 610 is initially created with a read lock on it, which allows threads associated with other contexts to read it but prevents them from writing to it. Next, a copy 630 is created 620 from the original version 610. A write lock is then automatically placed upon the copy, which prevents threads associated with other contexts from accessing or modifying copy 630. If the system does not automatically place write locks on the copy, write locks may have to be explicitly created. Since the copy 630 is exclusively held by the context, it is effectively privately owned by the context, and cannot be accessed by threads in other contexts. Once the copy is created from the original version, the read lock on the original version is released, allowing threads in other contexts to modify the original version. However, the preferred embodiment ensures that multiple contexts do not access the same original version 610 at the same time.

Next, the threads associated with the context perform a number of modifications on copy 630. For example, such modifications may include adding a new step to a plan or linking together existing steps in a different way. In order to add an additional step to a plan, the database application must first go through the connection 312 into the factory to create a new step. Step creation occurs when, for example, an icon corresponding to a step is dragged into the arena. After a number of modifications are made to copy 630, the copy may differ considerably from original version 610. In order to bring the original version into line with the copy, a "commit" command is used.

When a commit command is received from the user, the following sequence of steps occurs. First, a context 315 is activated in order to carry out the commit. Next, the copy 630 is used to update the original version 610 to reflect the modifications which have been made on the copy 660. Note that the system automatically creates write locks on the original version 610 as it is written to. After the original version 610 has been modified, the write lock is converted to a read lock, allowing other threads or contexts to read the original version 610.

Next, the thread signals a commit operation to the commit reload part, and goes on with its work. As far as the thread is concerned, the commit operation has been completed. Actually, the commit reload part performs the commit in a background thread. The commit operation is first placed on an internal queue in the commit reload part. When the commit comes to the head of the queue, the commit reload part performs the commit operation by generating database code and passing this code on to database management system 160. One embodiment associates update counts with objects in the database management system to ensure that updates are performed in the proper order. Before an object is modified in the database management system 160, the update count corresponding to the object is first retrieved from the database management system 160, and the update count is examined to ensure that it is a prior version of the object. If it is a prior version, the object is them retrieved, modified and subsequently committed to the database management system 160. This is unfortunately quite slow because it involves first performing a number of read and write operations to the permanent storage medium. (The slow speed of the commit operation heightens the need for the deferred commit.) After the commit reload part finishes performing the commit operation to database management system 160, it notifies the repository 230 that the commit operation has finished. Upon receiving such notification, the repository 230 releases the read locks on the original version 610. If the user or another thread attempts to perform an additional modification to original version 610 before the read lock is released, the subsequent commit will block pending completion of the preceding commit. However, as noted above, this rarely happens because a human user will typically take a considerable amount of time in thinking about and performing a subsequent modification, during which time the preceding commit operation will generally finish.

Note that the above-mentioned commit and undo operations take place on higher level plan objects. which may potentially be associated with a large number of lower level step objects. This means each commit or undo operation may actually involve copying, modifying, and committing a plan object along with its associated step objects.

If the commit operation to database management system 160 fails or takes an inordinately long amount of time to complete, and the read lock is not released, the system will give the user the option of trying the commit operation again.

As described above, one embodiment supports two types of commit operations. The first is a "dbms commit," which uses copy 630 to overwrite or modify original version 610, and these modifications are then committed to database management system 160. Alternatively, another embodiment provides for a "cache commit" operation, which simply uses copy 630 to overwrite or modify version 610, without a subsequent commit 670 to database management system 160.

During an undo operation 640, original version 610 is used to create a new copy 650 of original version 610. Once this new copy 650 is created, the old copy 630 is simply ignored or discarded.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in the art.

What is claimed is:

1. An apparatus for modifying a data item, comprising:
a client computer system including a first memory to store said data item, wherein said data item is modified in response to a request of a user of the client computer system;
a database server, coupled to said client computer system, to store a plurality of data items including said data item;
said computer system including a plurality of processes comprising at least one user process and at least one other process;
wherein the client computer system is operable to create a lock on the data item being modified to allow said at least one user process to read the modified data item from said first memory, while said at least one other process writes the modified data item from said first memory to said database server.

2. The apparatus of claim 1, wherein said client computer system includes a user interface for modifying said data item in response to user input.

3. The apparatus of claim 1, wherein said client computer system is to create a write lock on said data item, the write lock blocking said at least one other process from reading said data item and writing to said data item.

4. The apparatus of claim 1, in which said lock is a read lock blocking said plurality of processes from writing to said data item.

5. The apparatus of claim 1, wherein said at least one other process includes an event process to release said read lock.

6. The apparatus of claim 1, wherein said database server comprises a database management system.

7. The apparatus of claim 6 further comprising at least one on-line transaction processing system to access said database management system.

8. The apparatus of claim 6 further comprising a data warehouse to access said database management system.

9. A method for selectively undoing modification to a data item, comprising:
creating in a first memory an original version of a data item that is stored in a database server, the first memory being included in a client computer system coupled to the database server;
making a first copy of the original version in the first memory;
modifying said first copy of the original version in the first memory;
creating a second copy from said original version in the first memory, when a command is received to undo said modifications; and
creating a new data item in the database server from the modified first copy of the original version, when a command is received to commit said modifications.

10. The method of claim 9, wherein the database server comprises a database management system.

11. The method of claim 9 further comprising storing the modified first copy of the original version to a relational database.

12. The method of claim 10, wherein said data item comprises metadata, which describes relationships between data items in said database management system.

13. The method of claim 9, wherein creating a new data item from said copy comprises:
setting a read lock on said modified first copy in the first memory, which allows said plurality of processes to read said modified first copy, but blocks said plurality of processes from modifying said modified first copy;
creating a new data item from said modified first copy;
copying said modified first copy from said first memory to said database server, wherein a time interval to create said new data item and to copy said modified first copy defines a copy latency;
reading said modified first copy during said copy latency; and
releasing said read lock.

14. An apparatus for selectively undoing modification to a data item, comprising:
a database server to store a plurality of data items, including a particular data item; and
a client computer system, coupled to the database server, to create a first copy of the particular data item in a first memory of the client computer system, to modify the first copy of the particular data item in the first memory, to create a second copy of the particular data item in the first memory when receiving a command to undo the modification, and to trigger a creation of a new data item in the database server from the modified first copy of the particular data item when receiving a command to commit the modification.

15. A machine-readable medium containing instructions which, when executed by a processing system, cause the processing system to:
create in a first memory an original version of a data item that is stored in a database server, the first memory being included in a client computer system coupled to the database server;
make a first copy of the original version in the first memory;
modify said first copy of the original version in the first memory;
create a second copy from said original version in the first memory, when a command is received to undo said modifications; and
create a new data item in the database server from the modified first copy of the original version, when a command is received to commit said modifications.

* * * * *